United States Patent [19]

Fukunaga

[11] Patent Number: 4,654,157
[45] Date of Patent: Mar. 31, 1987

[54] THAWING AGENT

[75] Inventor: Hosaku Fukunaga, Osaka, Japan

[73] Assignee: Masanobu Makise, Osaka, Japan

[21] Appl. No.: 792,804

[22] Filed: Oct. 30, 1985

[30] Foreign Application Priority Data

Oct. 31, 1984 [JP] Japan ............................ 59-230692

[51] Int. Cl.$^4$ .............................................. C09K 5/00
[52] U.S. Cl. ................................................... 252/70
[58] Field of Search ......................................... 252/70

[56] References Cited

U.S. PATENT DOCUMENTS 1,915,018  6/1933  Ehrhardt ............................ 252/70
4,000,079  12/1976  Rasp et al. .......................... 252/75

FOREIGN PATENT DOCUMENTS 1229783  12/1966  Fed. Rep. of Germany .
3028372   2/1982  Fed. Rep. of Germany .
 156919   9/1982  German Democratic Rep. ... 252/70
   3853   1/1974  Japan ................................. 252/70

Primary Examiner—Robert A. Wax
Attorney, Agent, or Firm—Stiefel, Gross, Kurland & Pavane

[57] ABSTRACT

A thawing agent comprises as active ingredients a combination of magnesium chloride, magnesium sulfate and calcium chloride; magnesium chloride and magnesium sulfate; or magnesium chloride and calcium chloride which is substantially free from sodium chloride and whose ratio is within the area of rising isothermal lines of 3° C. or more in the attached FIG. 1.

9 Claims, 2 Drawing Figures

THAWING AGENT

BACKGROUND OF THE INVENTION

1. Field of the Invention

This invention relates to a thawing agent which can effectively prevent or remove freezing or snowdrifts of roads or on roofs, farm-land, etc., particularly to a thawing and antifreezing agent having great thawing and antifreezing effect and further having almost non-phytotoxicity.

Snow and ice are distributed on broad area of the earth in winter and interrupt normal traffics in that area and further, it not only makes farming works impossible but causes serious traffic accidents. In particular, in heavy snow teritories, snow usually gives damages on materials and mental and further impedes economical expansion at those territories because of rise in prices caused by interruption or delay of traffics and large expense to remove the drifted snow on roads or roofs, and moreover, lose in human lifes caused by traffic accidents, collapses of houses, etc.

2. Description of the Prior Art

As a countermove to the above snowdrift and freezing, there has usually been used sprinkling or spraying crude calcium chloride which is a by-product from Solvay soda process in the form of powder or concentrated solution, but this crude calcium chloride is at the most 70% or so purity. Thus, it cannot expect a sufficient antifreezing and thawing effect unless its frequent spreadings are done. Moreover, its spread in a large amount will severely injure plant or fresh water fishes and shells. Under such circumstances, the spread of calcium chloride has practically limited to main roads etc., but severe phytotoxicity to the planted trees at central separation zones and side zones thereof is usually seen. Although this phytotoxicity can be reduced by sufficient washing of the tainted trees at early spring on which the roots of the trees get into an action to absorb water in soil, such large scale washing the trees throughout the total length of long distance roads is practically impossible because of necessary water transport, much labour cost required, etc. In this connection, the superintendents of roads have been obliged to transplant withered trees at heavy expense every year.

The inventor has heretofore commented as to the defects of known thawing and antifreezing agents, in particular, as to their phytotoxicity. Besides, the known thawing and antifreezing agent has another defect of easy rust-forming which should not be overlooked. Owing to this defect, the cars that have run the road on which a thawing agent has been scattered must be washed well each time to exempt from rust formation and lowering of durable years caused thereby. Also, this embarasses the users in views of trouble and expense.

SUMMARY OF THE INVENTION

This inveniton is to provide a novel non-toxic thawing and antifreezing agent (hereinafter shortened as "thawing agent" including antifreezing agent) that has great antifreezing effect by basically improving known thawing agents which were mainly composed of calcium chloride. Additionally the present invention is to provide a thawing agent which has little rust-forming property and long durability, and further which accererates growth of cultivated plants.

Thus, the invention relates to a thawing agent comprising as active ingredients a combination of magnesium chloride, magnesium sulfate and calcium chloride; magnesium chloride and magnesium sulfate; or magnesium chloride and calcium chloride which is substantially free from sodium chloride and whose ratio is within the area of teritory of rising isothermal lines of 3° C. or more in the attached FIG. 1.

DETAILED EXPLANATION OF THE INVENTION

The inventor found that although pure calcium chloride is almost non-toxic to plants, crude calcium chloride obtained by Solvay soda process contains several impurities, especially sodium chloride which is not only toxic to plants, but also acts harmfully to lower the calorific value of the thawing agent by its negative heat of solution (that is, the value $\Delta H$ is minus). Then, the inventor tested on the heat of solution of the two component system consisting of magnesium chloride whose heat of solution is almost twice as that of calcium chloride (ca. 36 kcal/mol in 800 mols of water) and magnesium sulfate whose heat of solution is approximately similar to that of calcium chloride (ca. 20 kcal/mol in 800 mols of water) in which the above two components being mingled together at numerous ratios, and further similarly tested on the three components system composed of the above two components and calcium chloride which is substantially free from sodium chloride.

Unexpectedly, as the results of these tests, it has become clear that there is a great difference between the estimated calorific value (the value calculated on the basis of theoretical calorific value at which 1 mol of each component was dissolved into 800 mols of water: hereinafter tentatively called as "the theoretical calorific value") and actual calorific value measured by dissolving each the components or mixture thereof into 2% concentration. Furthermore it was found that the percentages obtained by dividing the actual calorific value with the theoretical calorific value and multiplying 100 were condiserably varied depending on the respective composition.

Figure 1:
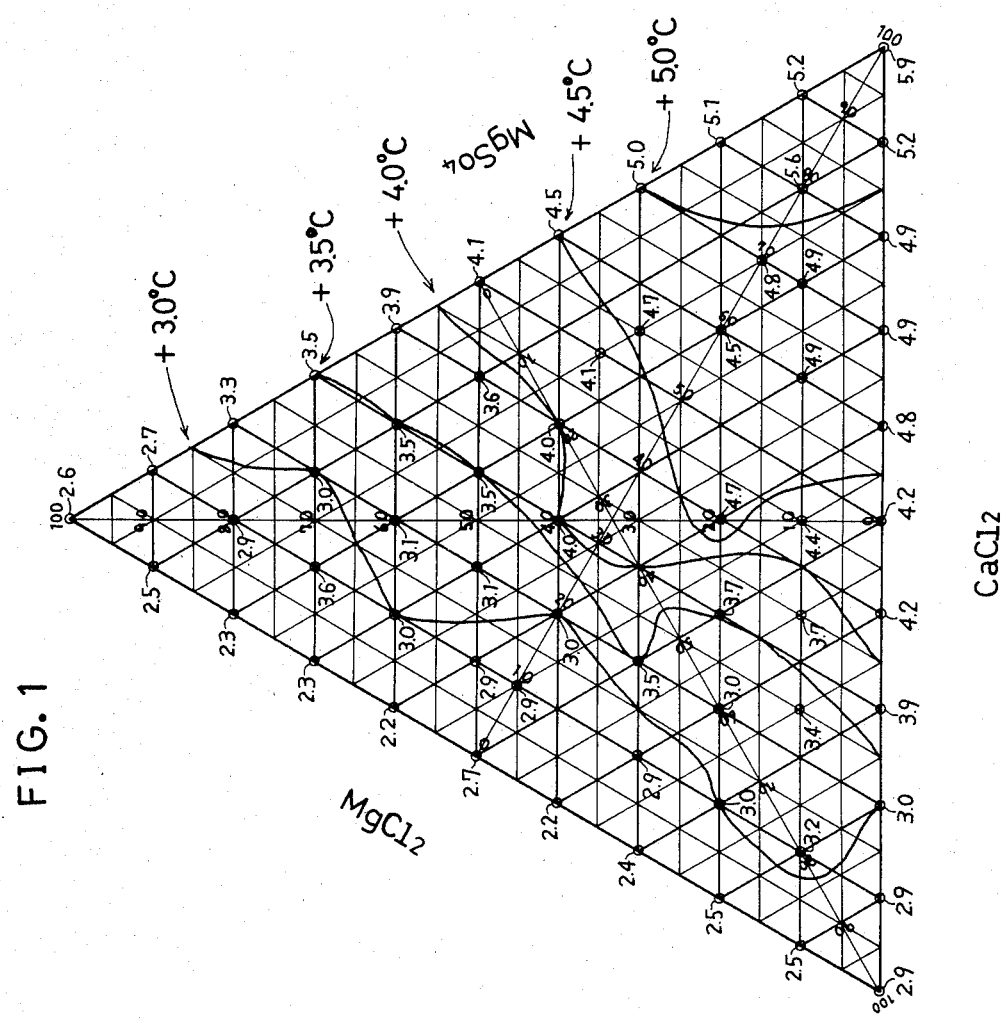
FIG. 1 is a triangular graph showing the rise in temperature (difference between original water temperature and elevated temperature by adding sample compositions; °C. ) when 1 g of each of the compositions of calcium chloride, magnesium chloride and magnesium sulfate at various ratios is dissolved in 50 ml of water.
Figure 2:
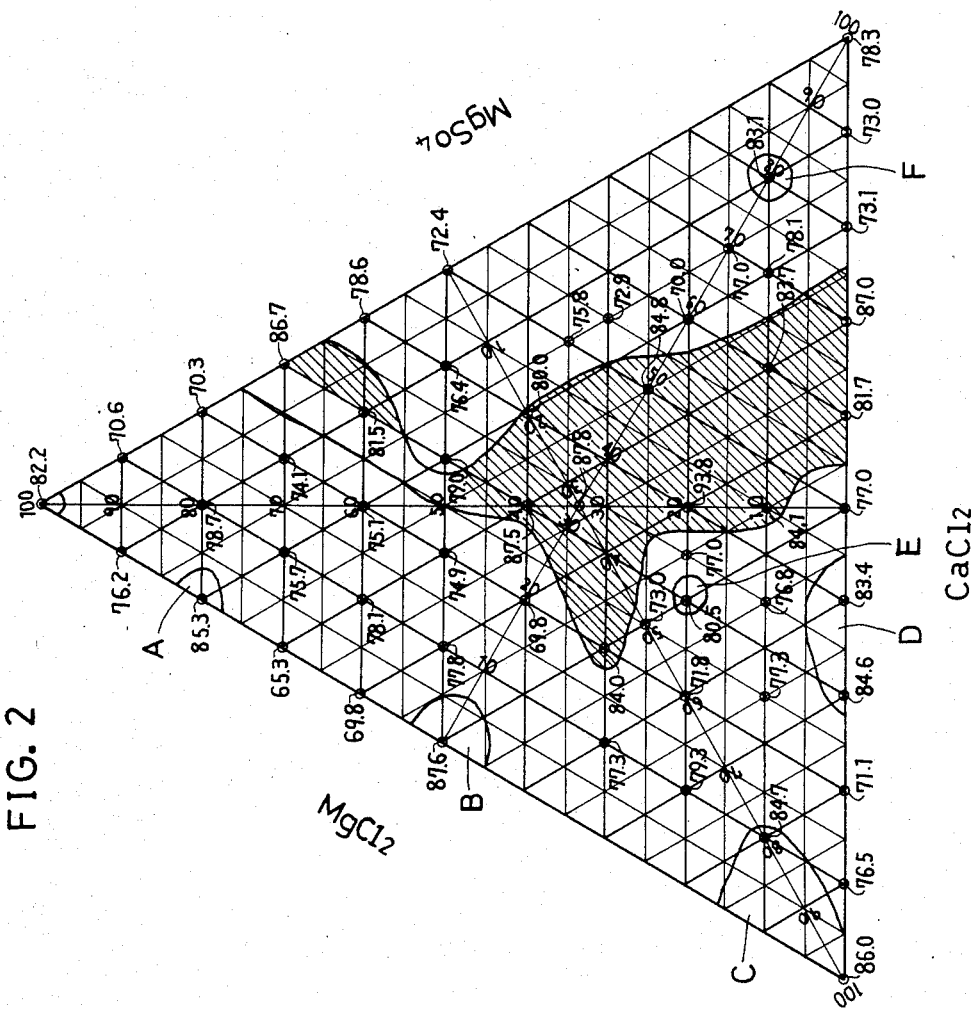
FIG. 2 is another triangular graph showing the efficiency of the heat generation (actually rise in temperature/temperature theoretically to be risen $\times 100\%$) at each plotted position in FIG. 1.

According to the graphs of FIGS. 1 and 2, the following tendency can be estimated or recognized:

1 The degree of the rise in temperature generally depends on the amount of magnesium chloride (see FIG. 1).

2 However, the rising isothermal lines are not always proportional to the amount of said magnesium chloride and varies in the range of 10–20% of the difference on the basis of said content. In other word, irrespective of the difference in the content of magnesium chloride, a similar calorification is noticed (see FIG. 1 ). Particularly, the heat of solution will be risen as the ratio of magnesium sulfate is increased.

3 The efficiency of the heat generation is inclined to be lowered as the amount of magnesium chloride is increased (see FIG. 2).

4 Preferred compositions having 80% or more of the efficiency of the heat generation and 3.5° C. or more of the rising temperature are those composed of mainly magnesium chloride and magnesium sulfate. If the amount of calcium chloride exceeds the half in the compositions, both the efficiency of the heat generation and the rising temperature tend to be lowered (see FIG. 1 and FIG. 2).

5 One of favorable compositions comprises about 20–40 w/w % of calcium chloride, about 30–50 w/w % of magnesium chloride and about 20–50 w/w % of magnesium sulfate provided that the total amount is 100 w/w %, from the viewpoint of the efficiency of the heat generation as well as the rise in temperature.

6 In order to expect over 3° C. of the rise in temperature, two or three component system consisting of (i) calcium chloride, magnesium sulfate and magnesium chloride, (ii) magnesium sulfate and magnesium chloride or (iii) calcium chloride and magnesium chloride is required (see FIG. 1).

On the other hand, tne inventor tested on phytotoxicity of many compositions comprising of these salts shown by TABLE 1 as to young seedlings of a horticulture variety of white radish (*Raphnus sativus L. acanthiformis Makino* ; Japanese name "KAIWAREDAIKON"). The data are summarized in the attached TABLE 2.

TABLE 1

(RELATION BETWEEN THE COMPOSITION THE THAWING AGENT AND CALORIFIC PROPERTY)

| SAMPLES INGREDIENT (%) | A 1 | B | C | D | E | F | G | H | I | J | J-2 |
|---|---|---|---|---|---|---|---|---|---|---|---|
| $CaCl_2$ | 97.83 | 96.85 | 95.87 | 96.85 | 96.85 | 92.94 | 88.05 | 95.87 | 94.89 | 83.16 | 83.16 |
| $MgCl_2.6H_2O$ | 0.45 | 0.44 | 0.44 | 0.41 | 0.44 | 0.43 | 0.41 | 0.44 | 0.44 | 0.38 | 0.38 |
| $Na_2SO_4$ | 0.11 | 0.11 | 0.11 | 0.11 | 0.11 | 0.10 | 0.10 | 0.11 | 0.11 | 0.09 | 0.09 |
| binder 2 | 1.11 | 1.11 | 1.09 | 1.11 | 1.11 | 1.05 | 1.00 | 1.09 | 1.08 | 0.94 | 0.94 |
| $MgSO_4$ | 0.00 | 0.00 | 0.00 | 0.00 | 0.00 | 0.00 | 0.00 | 0.00 | 0.00 | 0.00 | 0.00 |
| $MgCl_2$ | 0.00 | 1.00 | 1.00 | 0.00 | 1.00 | 5.00 | 10.00 | 2.00 | 1.00 | 15.00 | 13.00 |
| $KH_2PO_4$ | 0.00 | 0.00 | 1.00 | 0.00 | 0.00 | 0.00 | 0.00 | 0.00 | 1.00 | 0.00 | 2.00 |
| $NaH_2PO_4$ | 0.00 | 0.00 | 0.00 | 0.00 | 0.00 | 0.00 | 0.00 | 0.00 | 0.00 | 0.00 | 0.00 |
| $AlCl_3$ | 0.00 | 0.00 | 0.00 | 0.00 | 0.00 | 0.00 | 0.00 | 0.00 | 1.00 | 0.00 | 0.00 |
| $FeCl_2$ | 0.00 | 0.00 | 0.00 | 1.00 | 0.00 | 0.00 | 0.00 | 0.00 | 0.00 | 0.00 | 0.00 |
| KCl | 0.00 | 0.00 | 0.00 | 0.00 | 0.00 | 0.00 | 0.00 | 0.00 | 0.00 | 0.00 | 0.00 |
| $MnCl_2$ | 0.00 | 0.00 | 0.00 | 0.00 | 0.00 | 0.00 | 0.00 | 0.00 | 0.00 | 0.00 | 0.00 |
| $CuSO_4$ | 0.00 | 0.00 | 0.00 | 0.00 | 0.00 | 0.00 | 0.00 | 0.00 | 0.00 | 0.00 | 0.00 |
| $MgCl_2/CaCl_2$ | 0.000 | 0.010 | 0.010 | 0.010 | 0.010 | 0.054 | 0.114 | 0.021 | 0.011 | 0.180 | 0.156 |
| Rise in Temp. 3 | 25.0 | 25.5 | 25.0 | 24.5 | 25.6 | 28.2 | 30.5 | 26.2 | 26.0 | 34.0 | 30.0 |
| Temp. Difference 4 | 1.3 | — | 1.0 | — | — | 1.5 | — | 1.0 | 1.0 | 2.0 | 2.5 |

| SAMPLES INGREDIENT (%) | K | M | N | O | P | P-2 | Q | R | S | T | U |
|---|---|---|---|---|---|---|---|---|---|---|---|
| $CaCl_2$ | 100.00 | 0.00 | 48.92 | 82.70 | 85.00 | 85.00 | 85.00 | 80.00 | 88.38 | 60.00 | 50.00 |
| $MgCl_2.6H_2O$ | 0.00 | 0.00 | 0.23 | 0.38 | 0.00 | 0.00 | 0.00 | 0.00 | 0.00 | 0.00 | 0.00 |
| $Na_2SO_4$ | 0.00 | 0.00 | 0.05 | 0.09 | 0.00 | 0.00 | 0.00 | 0.00 | 0.00 | 0.00 | 0.00 |
| binder 2 | 0.00 | 0.00 | 0.49 | 0.94 | 0.00 | 0.00 | 0.00 | 0.00 | 0.38 | 0.00 | 0.00 |
| $MgSO_4$ | 0.00 | 0.00 | 0.00 | 0.00 | 0.00 | 0.00 | 10.00 | 7.00 | 0.00 | 20.00 | 25.00 |
| $MgCl_2$ | 0.00 | 100.00 | 50.00 | 10.00 | 10.00 | 10.00 | 0.00 | 10.00 | 10.39 | 10.00 | 10.00 |
| $KH_2PO_4$ | 0.00 | 0.00 | 0.00 | 0.00 | 1.00 | 0.00 | 1.00 | 5.00 | 1.04 | 5.00 | 5.00 |
| $NaH_2PO_4$ | 0.00 | 0.00 | 0.00 | 0.00 | 0.00 | 1.00 | 0.00 | 0.00 | 0.00 | 0.00 | 0.00 |
| $AlCl_3$ | 0.00 | 0.00 | 0.00 | 0.00 | 0.00 | 0.00 | 0.00 | 0.00 | 0.00 | 0.00 | 0.00 |
| $FeCl_2$ | 0.00 | 0.00 | 0.00 | 0.00 | 0.00 | 0.00 | 0.00 | 0.00 | 0.00 | 0.00 | 0.00 |
| KCl | 0.00 | 0.00 | 0.00 | 5.00 | 4.00 | 4.00 | 4.00 | 5.00 | 0.00 | 5.00 | 10.00 |
| $MnCl_2$ | 0.00 | 0.00 | 0.00 | 0.00 | 0.00 | 0.00 | 0.00 | 0.00 | 0.10 | 0.00 | 0.00 |
| $CuSO_4$ | 0.00 | 0.00 | 0.00 | 0.00 | 0.00 | 0.00 | 0.00 | 0.00 | 0.10 | 0.00 | 0.00 |
| $MgCl_2/CaCl_2$ | — | — | 1.022 | 0.121 | 0.120 | 0.120 | — | 0.125 | 0.115 | 0.167 | 0.200 |
| Rise in Temp. 3 | 28.5 | 33.0 | 30.0 | 29.8 | 30.2 | 30.5 | 30.2 | 31.0 | 31.5 | 31.0 | 30.8 |
| Temp. Difference 4 | 1.0 | 5.5 | 2.5 | 2.3 | 2.7 | 3.0 | 2.7 | 3.5 | 2.6 | 3.0 | 2.8 |

Note
1 Fundamental composition
2 Hydoxyethyl cellulose
3 Differences between the risen temperature when each 10 grams of each sample was dissolved into each 50 ml of $H_2O$ and water temperature prior to dissolution (In commercial $CaCl_2$ thawing agent the risen temperature 24.5°C. temperature difference = 0.5° C.)
4 Difference in water temperature between that of 3 days after dissolution of 20% solution and that of tap water allowed to stand in the same room.

TABLE 2

(INFLUENCE ON GROWTH OF SEEDLINGS OF A HORTICULTURE VARIETY OF WHITE RADDISH)

| SAMPLE | H2O/ml 1 | WEIGHT of SEED | Amt. of poured/days | GROWING CONDITION/day's 1st | 2nd | 3rd | 4th | 5th | 6th | FINAL SAMPLE CONCENTRATION |
|---|---|---|---|---|---|---|---|---|---|---|
| A | 100 | 3.5 | 5 ml | normal | normal | noraml | good a little | good a little | good a little | 3.0 |
| C | 100 | 3.5 | 5 ml | normal | normal | normal | good a little | good a little | good a little | 3.0 |
| F | 200 | 7.0 | 10 ml | normal | normal | normal | good a little | good a little | good a little | 3.0 |
| G | 200 | 7.0 | 10 ml | normal | normal | normal | good | good | good | 3.0 |
| H | 100 | 3.5 | 5 ml | normal | normal | normal | good a little | good a little | good a little | 3.0 |
| J | 200 | 15.0 | 10 ml | normal | normal | normal | superior | superior | superior | 3.0 |
| K-2 4 | 200 | 7.0 | 10 ml | normal | normal | stems whitend | leaves blackend | whithered | — | 2.0 |
| L 5 | 100 | 3.5 | 0 ml | normal | normal | normal | normal | normal | normal | — |
| M | 200 | 4.0 | 10 ml | normal | normal | bad a little | bad | whithered | — | 2.0 |
| N | 200 | 4.0 | 10 ml | normal | normal | good | superior | superior | superior | 3.0 |
| O | 200 | 4.0 | 10 ml | normal | good | good | superior | best | best | 3.0 |
| P | 300 | 8.3 | 15 ml | normal | normal | good a little | good a little | good a little | good a little | 3.0 |
| P-2 | 300 | 8.3 | 15 ml | normal | normal | normal | normal | normal | normal | 3.0 |
| Q | 200 | 4.3 | 10 ml | normal | normal | normal | bad a little | bad a | normal | 3.0 |
| R | 200 | 4.0 | 10 ml | normal | normal | normal | normal | normal | normal | 3.0 |
| S | 300 | 8.3 | 15 ml | normal | normal | normal | bad | whithered | — | 2.0 |

Note
1 The amount of wate in the testing pots.
2 10% water solution of each sample was diluted with proper amount of water and added after 7 days of the seeding up to a defined amount.
3 The calculated concentration in the final sample solution.
4 Commercial calcium chloride for thawing use(control).
5 control(water only).

As clear from this table, calcium chloride free from sodium chloride is non-toxic to the tested plant (Sample A). This fact is almost not influenced by addition of magnesium chloride or magnesium sulfate (Sampels C, F, G, H, J, N, O, P, P-2, Q and R). And magnesium chloride rather promotes growth of the plant, if an adequate amount is added (SAMPLES J and N).

The present invention bases on these findings.

Calcium chloride substantially free from sodium chloride can easily be obtained by reacting limestone that is abundantly present world-wide with hydrochloric acid according to the following equation.

$$CaCO_3 + 2HCl = CaCl_2 + H_2O + CO_2 \uparrow$$

According to the above formula, calcium chloride is to be obtained in the form of monohydrate, but in practice, it is obtained in the form of polyhydrates such as hexahydrate because of abundant water from liquid hydrochloric acid. Therefore, in order to accommodate it to the object of this invention, it should be dehydrated up to dihydrate, or preferably to anhydride by heating (the heat of solution of this calcium chloride will be lowered as the water content increases and final hexahydrate is rather endothermic). Besides, in the above reaction, small amount of the impurities in the limestone, such as iron, magnesium or aluminum will be salted out in the form of their halides, but in practice, such impurities do not influence the use of the product.

Magnesium sulfate substantially free from sodium chloride can experimentally be obtained by dissolving metallic magnesium into sulfuric acid. However, it can easily be prepared by dehydrating natural Epsom salt (MgSO$_4$·7H$_2$O) or kieserite (MgSO$_4$·1H$_2$O) which can be obtained as one by-product from halite industry. The latter kieserite per se is also useful instead of anhydrous sulfate because this generates considerable heat of solution. Natural kainite (KCl·MgSO$_4$·3H$_2$O) is also available as the component of the present invention after dehydration.

Magnesium chloride (anhydrous) generates about 38 kcal per mol of the heat of solution when dissolved into 800 mols of water. Alternatively, magnesium sulfate (anhydrous) generates slightly over ½ of the solution of heat (about 20 kcal/mol) of that of the former and further this promotes growth of plants.

Moreover, calcium chloride (anhydrous) generates ca. 18 kcal/mol of solution of heat when dissolved into 800 mols of water and the mixture with snow or ice does not freeze up to −45° C. Additionally, it raises the efficiency of the heat generation if it is present in the amount of not more than one-half among the composition.

The ratio by weight of each component in the above composition may be varied within considerable broad range. But as seen from FIG. 1 and FIG. 2, in case where 2% solution was used (it is presumably similar to actual condition in presumption of the apparent specific gravity of fresh snow=0.1), the composition is preferred mainly to be composed of about 20–65 w/w % of magnesium chloride, about 20–50 w/w % of magnesium sulfate and 0–50 w/w % of calcium chloride.

Especially, the area of the oblique line in FIG. 1 seems to be optimal in view of balanced rise in temperature (3.5° C. or more) and efficiency of the heat generation (80% or more) (In FIG. 2, A, B, C, D, E and F mean the areas which merely have 80% or more of efficiency of the heat generation).

However, the selection of practically useful composition should be done in consideration of several factors, such as the price of the raw material, easiness in obtaining the raw materials, product balance with other concerned products, desired calorific value, influences on plants and rust-forming etc. Thus, it is proposed to adopt a composiiton in which nearly equal amount of each magnesium chloride, magnesium sulfate and calcium chloride are contained within the varied range of ±10%.

In addition, the inventor further investigated on the action of potassium chloride and alkali metal phosphates in the co-existence of the above two or three active ingredients. Examples of alkali metal phosphates include potassium phosphate, potassium hydrogen phosphate, sodium phosphate, sodium hydrogen phosphate, alkali metal salts of metaphosphoric acid, pyrophosphoric acid and polyphosphoric acid. Instead of potassium chloride, potassium sulfate and potassium nitrate may be used.

As the result, it has found that potassium chloride is effective to promote growth of the plant (Sample O) and on the other side, alkali metal phosphates are markedly effective to prevent rust-forming by calcium chloride and potassium chloride as shown by TABLE 3.

TABLE 3

(RELATION BETWEEN THE COMPOSITIONS AND RUST-FORMING)

| SAMPLE | $KH_2PO_4$ CONCENTRATION 2 | DAYS ELAPSED | | | | | | | | | |
|---|---|---|---|---|---|---|---|---|---|---|---|
| | | 1 | 2 | 3 | 4 | 5 | 6 | 7 | 8 | 9 | 10 |
| A | 0.0 | ▲ | X | — | — | — | — | — | — | — | — |
| | 0.5 | ◉ | ◉ | ◉ | ◉ | ◉ | ◉ | ◉ | ◉ | ◉ | ◉ |
| | 1.0 | ◉ | ◉ | ◉ | ◉ | ◉ | ◉ | ◉ | ◉ | ◉ | ◉ |
| | 1.5 | ◉ | ◉ | ◉ | ◉ | ◉ | ◉ | ◉ | ◉ | ◉ | ◉ |
| | 2.0 | ◉ | ◉ | ◉ | ◉ | ◉ | ◉ | ◉ | ◉ | ◉ | ◉ |
| C | 0.0 | ▲ | X | — | — | — | — | — | — | — | — |
| | 0.5 | ◉ | ◉ | ◉ | ◉ | ◉ | ◉ | ◉ | ◉ | ◉ | ◉ |
| | 1.0 | ◉ | ◉ | ◉ | ◉ | ◉ | ◉ | ◉ | ◉ | ◉ | ◉ |
| | 1.5 | ◉ | ◉ | ◉ | ◉ | ◉ | ◉ | ◉ | ◉ | ◉ | ◉ |
| | 2.0 | ◉ | ◉ | ◉ | ◉ | ◉ | ◉ | ◉ | ◉ | ◉ | ◉ |
| G | 0.0 | ▲ | X | — | — | — | — | — | — | — | — |
| | 0.5 | ◉ | ◉ | ◉ | ◉ | ◉ | ◉ | ◉ | ◉ | ◉ | ◉ |
| | 1.0 | ◉ | ◉ | ◉ | ◉ | ◉ | ◉ | ◉ | ◉ | ◉ | ◉ |
| | 1.5 | ◉ | ◉ | ◉ | ◉ | ◉ | ◉ | ◉ | ◉ | ◉ | ◉ |
| | 2.0 | ◉ | ◉ | ◉ | ◉ | ◉ | ◉ | ◉ | ◉ | ◉ | ◉ |
| J | 0.0 | ▲ | X | — | — | — | — | — | — | — | — |
| | 0.5 | ◉ | ◉ | ◉ | ◉ | ◉ | ◉ | ◉ | ◉ | ◉ | ◉ |
| | 1.0 | ◉ | ◉ | ◉ | ◉ | ◉ | ◉ | ◉ | ◉ | ◉ | ◉ |
| | 1.5 | ◉ | ◉ | ◉ | ◉ | ◉ | ◉ | ◉ | ◉ | ◉ | ◉ |
| | 2.0 | ◉ | ◉ | ◉ | ◉ | ◉ | ◉ | ◉ | ◉ | ◉ | ◉ |
| K | 0.0 | ▲ | X | — | — | — | — | — | — | — | — |
| | 0.5 | ○ | ▲ | X | — | — | — | — | — | — | — |
| | 1.0 | ○ | ▲ | X | — | — | — | — | — | — | — |
| | 1.5 | ○ | ▲ | X | — | — | — | — | — | — | — |
| | 2.0 | ○ | ▲ | X | — | — | — | — | — | — | — |
| M | 0.0 | ▲ | X | — | — | — | — | — | — | — | — |
| | 0.5 | ◉ | ◉ | ◉ | ○ | ○ | ○ | ○ | ○ | ○ | ○ |
| | 1.0 | ◉ | ◉ | ◉ | ○ | ○ | ○ | ○ | ○ | ○ | ○ |
| | 1.5 | ◉ | ◉ | ◉ | ○ | ○ | ○ | ○ | ○ | ○ | ○ |
| | 2.0 | ◉ | ◉ | ◉ | ○ | ○ | ○ | ○ | ○ | ○ | ○ |
| P | 0.0 | ▲ | X | — | — | — | — | — | — | — | — |
| | 1.0 | ◉ | ◉ | ◉ | ◉ | ◉ | ◉ | ◉ | ◉ | ◉ | ◉ |
| P2 | 0.0 | ▲ | X | — | — | — | — | — | — | — | — |
| | 1.0 | ◉ | ◉ | ◉ | ◉ | ◉ | ◉ | ◉ | ◉ | ◉ | ◉ |
| Q | 0.0 | ▲ | X | — | — | — | — | — | — | — | — |
| | 1.0 | ◉ | ◉ | ◉ | ◉ | ◉ | ◉ | ◉ | ◉ | ◉ | ◉ |
| R | 0.0 | ▲ | X | — | — | — | — | — | — | — | — |
| | 1.0 | ○ | ○ | ▲ | ▲ | ▲ | ▲ | ▲ | ▲ | ▲ | ▲ |
| S | 0.0 | ▲ | X | — | — | — | — | — | — | — | — |
| | 1.0 | ◉ | ◉ | ○ | ○ | ○ | ▲ | ▲ | ▲ | ▲ | ▲ |
| T | 0.0 | ▲ | X | — | — | — | — | — | — | — | — |
| | 5.0 | ○ | ○ | ○ | ○ | ○ | ○ | ○ | ▲ | ▲ | ▲ |
| U | 0.0 | ▲ | X | — | — | — | — | — | — | — | — |
| | 5.0 | ○ | ○ | ○ | ○ | ○ | ○ | ○ | ▲ | ▲ | ▲ |

NOTE
1   10 mm × 10 mm of zinc plated iron plate was soaked slDightly into 2% water solution of each sample and allowed to stand for testing duration at room temperature(at 28–31° C.). The tested samples were then observed with naked eye as to their rusted condition.
[STANDARD FOR JUDGEMENT]
◉: not rusted
○: slightly rusted
▲: distinctly rusted
X: markedly rusted
—: not tested
2   Concentration in the dry samples.

Phosphates, in particular alkali metal salts of phosphoric acid act to improve acidic soil by its buffering action, and to weaken the acidification to soil by magnesium sulfate as the principal component. Thus, it is preferable as the component of the thawing agent for farmland use. In addition, said phosphates can prevent rust-forming. Therefore, it is also useful as the component of the thawing agent for road. Although an adequate content of the phosphates are about 5 w/w % in the final composition, such amount may eutrophicate water.

Accordingly, the amount of these salts in the composition for common use or road should preferably be limited to 2% or less, said concentration being sufficient to prevent rust-forming.

Soluble potassium salts such as potassium chloride may be present as much as 10% in the composition, but it becomes endothermic when dissolved into water. Therefore, the content of these salts should preferably be 5% or less.

Iron salts are available for preventing chlorosis of rice plant growing at old paddy field in which reductive reaction has proceeded. However, except such special case, comparatively small amount, for example, as small as 1% or less in the composition of iron salt is satisfactorily added, if any.

Micronutrients which are necessary for growth of plants such as copper, manganese, zinc, boron etc., may be added in the form of water-soluble salts such as copper sulfate, manganese chloride, zinc chloride, boric acid or borax, if need be. However, such micronutrients are universally exisiting in most soil in a microamount in accordance with the plants' demand. Thus, the addition of such micronutrients is voluntary. Besides, the above micronutrients may be added in the water-insoluble form such as cuprous or cupric hydroxide with a chelater such as ethylendiamine tetraacetic acid or a complex salt-forming compound such as metaphosphates.

In addition to the above, several auxiliary ingredients such as nitrates, ammonium salts, ureides and cyanamides, for example, ammonium carbonate, ammonium sulfate, ammonium chloride, calcium cyanamide or urea may be added as the supplementary components. Since these compounds have fertilizing effect to plants as nitrogen source, they are useful as auxiliary components of the thawing agent for farm-land use.

Furthermore, some reactive ingredients such as aluminum chloride, lime or powdery iron may be added, if desired. Since these ingredients generate large heat of reaction when reacted with oxygen or water they are useful for the object of the present invention, but they also have some defects such as aluminum chloride which generates hydrochloric acid with water or lime which remains white residual insolubles. But, generation of hydrochloric acid by aluminum chloride can be prevented by compounding lime together and simultaneously, while the formation of residual insolubles (calcium hydroxide) by lime is also able to be hindered. Soluble potassium salts forms a mineral, "carnallite" with hexahydrate of magnesium chloride. The calcined product at a low temperature of it contains magnesium oxychloride and magnesium oxide as well as magnesium chloride. Thus, this calcined product is also available, if the amount to be added is so small as not to form magnesia cement.

The composition of this invention may contain several cheap heat radiation absorbent such as coal cinder, pulverized carbonated rice hull, pulverized charcoal and various dyes or pigments. Not only the colored granules of the present invention by such heat radiation absorbents or by dyes or pigments makes possible measuring a spread amount whereby the amount of the spread agent can be averaged but the colored granules absorb far more radiation heat than white one so as to accererate melting of remaining snow. As the typical illustration of inorganic pigments is lead yellow, zinc yellow, cadmium yellow, Naples yellow, yellow earth (the above is yellow), Indian red, red lead, cadmium red, cinnabar (the above is red), Mars violet, Nuernberg violet, cobalt violet (the above is violet), ultramarine, Berliner blue, cobalt blue (the above is blue), chrome green, chrome oxide, cobalt green, powdered malachite (the above is green) etc. Alternatively, many organic dyes, for example, auramine, Persian orange, eosine, rhodamine, methyl-violet, malachite green and Victoria blue or the like are usable as water-soluble coloring agent as it is or as water-insoluble coloring agent by lake formation therefrom. In this invention, the selection of pigment or dye is limitless but in consideration of toxity and carcinogenity, it is desirable to avoid the use of ones containing toxic heavy metals such as lead, cadmium and chrome or of azo dyes.

The composition of this invention may be crystalline or pulverized form, but granular or tablet form is more preferable in order to improve durability. These granular or tablet composition is somewhat inferior to the former in view of immediate effect. But, by its good durability, it prevents snowdrift or freezing for long duration of time, if it is scattered before snow-fall or ice-bonding. The scattered granular or tablet thawing agent on the surface of snowdrift is dissolving itself with the generation of heat and sink into snow or ice layer. The generated heat from this sunk granule or tablet will be stored in that snow or ice so as to exert perseverant thawing or antifreezing effect because of small specific heat of snow or ice. The scale of these granule or tablet is commonly selected from the range of 1–8 m/m in diameter as the case may be. And, if several sorts of granules or tablets having different averaged diameter are mingled, they become preferable thawing agent having immediate effect and persevering effect together.

On the other side, flaky product having 0.5–2 mm thickness is preferable to scatter on inclined surface such as roofs or slopes and further it is far more durable than mere powdery or crystalline product.

Small amount of binder may be added into the above granular or flaky product, if need be. As the binder, it is desirable to select cheap material such as starch paste, soy or milk whey concentrate, sulfite pulp effluent, hydroxyethyl cellulose, methyl cellulose, waste molasses, dextrin or the like. The amount of water to dissolve or disperse the pasty material is as small as possible in order to prevent hydration of the ingredients. Moreover, in case where a reactive ingredient such as aluminum chloride or lime is used, it is preferred to shape it in granular or flaky form with an organic solvent-soluble thickener such as methyl cellulose having 38–43% methoxylation degree. Such use of non-aqueous solvent should be recommended for common granulation process to minimize hydration.

EXAMPLE 200 grams of calcium chloride (first class reagent), 400 grams of magnesium chloride, 400 grams of magnesium sulfate, 50 grams of potassium chloride, 25 grams of sodium hydrogen phosphate, 5 grams of ferrous chloride and 1 gram of malachite green lake were pulverized and intimately mixed in a trommel in a dried atmosphere.

The mixture thus obtained was then put into a small onion-shaped granulating machine and granulated with 220 ml of 5% hydroxyethyl cellulose solution slowly dropped thereinto under warm dried air blown into to give about 1050 grams of granular product.

This granular product was then sifted out with 1 mm and 5 mm sifters to give mixed granular product having diameters more than 1 m/m and less than 5 m/m. This product is beautiful green granules and has as twice as calorific value as compared with known calcium chloride thawing agent, and further, it is non-phytotoxic thawing agent with immediate and durable effect, and easy to weigh and handle. Moreover, this product can further be classified into adequate sizes suitable for specific uses by further shifting.

Now, the above product is somewhat unsuitable as the thawing agent to be applied to farm-land in which has not been seeded or to seed-bed, but once germinated it promotes the growth of the seedlings and specifically increases the diameter of the stems of said seedlings. Thus, it has remarkable effect as the thawing agent having fertilizing action for farms of biennial crops such as wheat and barley. Furthermore, as the thawing agent for road, this product is superior as non-phytotoxic and non-rusting durable thawing agent.

As hereinbefore described, this invention has great significance for common good by offering cheap and non-phytotoxic thawing agent having superior thawing and antifreezing effect.

What is claimed is:

1. A solid thawing agent which comprises a binary or ternary mixture of magnesium chloride and a component selected from the group consisting of calcium chloride, magnesium sulfate and mixtures thereof, said agent being substantially free from sodium chloride, and the respective salts being admixed in proportions within the area of rising isothermal lines of 3.5° C. or more in FIG. 1, and within the areas of heat generation efficiencies of at least 80% shown in the diagonally lined areas and areas D, E and F of FIG. 2, of the drawings.

2. A thawing agent according to claim 1 which contains 20-65 w/w % of magnesium chloride, 20-50 w/w % of magnesium sulfate and 0-50 w/w % of calcium chloride on the total amount of these active ingredients.

3. A thawing agent according to claim 1 which further contains an auxiliary ingredient selected from the group consisting of an alkali metal phosphate, potassium chloride, and mixtures thereof.

4. A thawing agent according to claim 1 which is in a granular or tablet form.

5. A thawing agent according to claim 1 which is in flaky form.

6. A thawing agent according to claim 1 which is colored.

7. A thawing agent according to claim 1, which contains 30-50 w/w % magnesium chloride, 20-50 w/w % magnesium sulfate and 20-40 w/w % calcium chloride, on the total amount of these active ingredients.

8. A thawing agent according to claim 1, in which the salts are admixed in proportions within the areas of heat generation efficiencies of at least 80% shown in the diagonally lined areas of FIG. 2 of the drawing.

9. A thawing agent according to claim 1, in which each of said salts is substantially free of water.

* * * * *